Fig. 1.

INVENTORS
James L. White
BY Herman W. Hawker.
Alva D. Adams
Attorney

Aug. 23, 1949.　　　J. L. WHITE ET AL　　　2,480,067
APPARATUS FOR PREPARING BAST
FIBROUS PLANTS AND PROCESS

Filed March 11, 1946　　　8 Sheets-Sheet 3

INVENTORS
James L. White
BY Herman W. Hawker
Alva D. Adams
Attorney

Aug. 23, 1949.  J. L. WHITE ET AL  2,480,067
APPARATUS FOR PREPARING BAST
FIBROUS PLANTS AND PROCESS
Filed March 11, 1946   8 Sheets-Sheet 6

Fig. 10.

SHOWING THE METHOD
OF HANGING RIBS.

INVENTORS
James L. White
BY Herman W. Hawker.
Alva D. Adams
Attorney

Inventors
James L. White
Herman W. Hawker

By Alva D. Adams
Attorney

Aug. 23, 1949.

J. L. WHITE ET AL
APPARATUS FOR PREPARING BAST
FIBROUS PLANTS AND PROCESS 2,480,067

Filed March 11, 1946

Inventors
James L. White
Herman W. Hawker

By Alva D. Adams
Attorney

UNITED STATES PATENT OFFICE 2,480,067

APPARATUS FOR PREPARING BAST FIBROUS PLANTS AND PROCESS

James L. White, Buffalo, and Herman W. Hawker, Teague, Tex.; said White assignor of one-half of his interest to said Hawker Application March 11, 1946, Serial No. 653,578

7 Claims. (Cl. 19—6)

This invention relates to apparatus for processing ramie and similar bast fibrous plants through the decorticating stage to produce undegummed fibers of a staple length suitable for manufacturing thread, yarn, textiles and the like in mills equipped for handling fibers such as cotton or flax which have a shorter staple length than ramie. The product of the apparatus of the invention may be degummed in conventional manner. The invention also relates to a process for producing bast fibers having a shorter staple length than the average length of the natural fiber. In its broadest aspects, the invention relates to a method of and an apparatus for producing undegummed bast fibers from bast fiber containing plants.

An object of the invention is to provide an improved machine which will continuously, and without the intervention of manual aid, receive cut green stalks of ramie, having stems and leaves attached, cut the stalks to desired length, separate the stems and leaves from the cut lengths of stalk, flatten or crush the cut lengths of stalk preparatory to decortication without injuring the fibers, and, thereafter, decorticate the flattened stalk lengths and separate the undegummed fibers from the pithy and woody matter.

Another object is to provide a process for preparing undegummed ramie fiber from green harvested ramie plants including the operations of cutting the stalks to the desired length, separating leaves and leaf-stems from the cut stalk lengths, flattening the cut stalk lengths to break up the woody and pithy matter, and removing and separating the fiber-containing cortex from the woody and pithy matter.

Another object is to provide means and a method for rapidly and economically processing bast fibrous plants to produce undegummed fibers having a preselected length.

Still another object is to provide an apparatus for treating ramie through the decorticating stage which apparatus will handle the plants as harvested without requiring preliminary de-leafing.

The individual fiber cells of ramie are said to be longer than those of any plant yielding textile or cordage fiber which is utilized in commerce. The ultimate cells of ramie fiber range from one-half inch to 20 inches in length and average 6 to 8 inches. As contrasted with this, ordinary cotton staple is seven-eighths to one and one-fourth inches long; above this it becomes "long staple" cotton. The ultimate fibers of flax and hemp average about one and one-fourth inches in length.

Because of the relatively great length of ramie fiber, the stalks of ramie can be pre-cut to the approximate length desired in the product, in accordance with the present invention, without greatly reducing the average fiber length of the product.

The invention will be more particularly described with reference to the accompanying drawings wherein.

Figure 2:
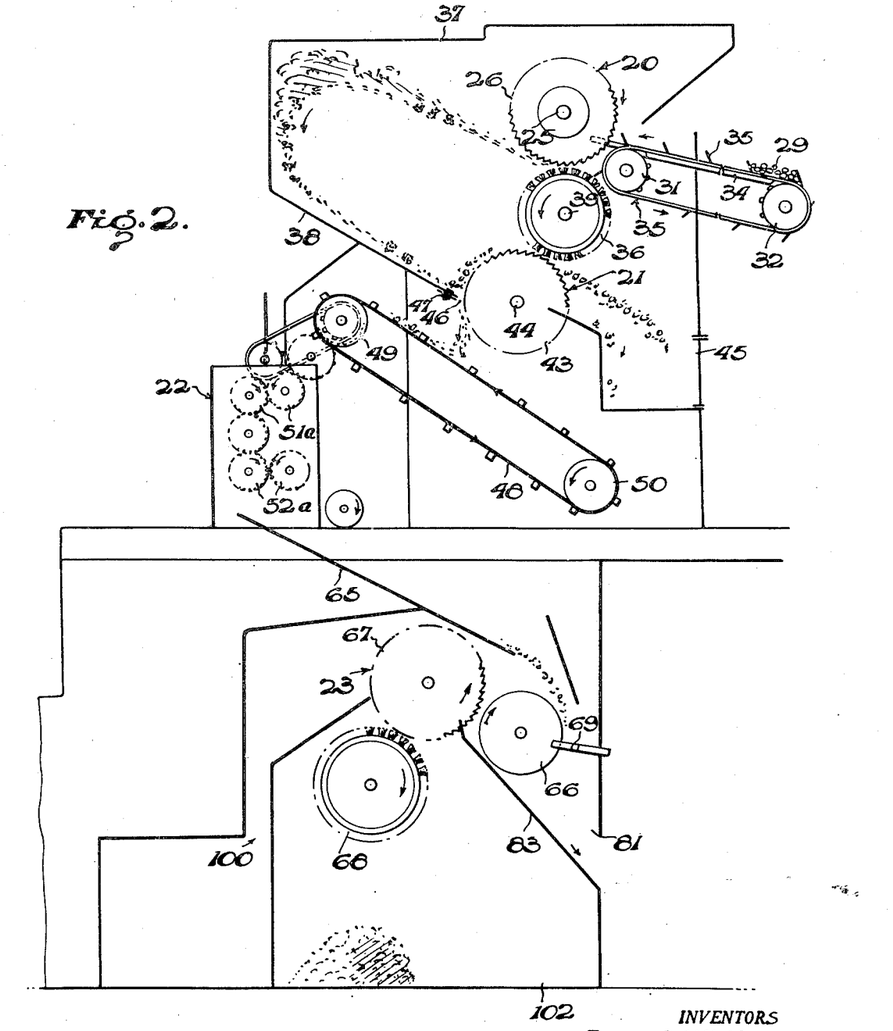
Fig. 2 is a diagrammatic vertical sectional view of the apparatus shown in Fig. 1.

Referring to the drawings, particularly to Fig. 2 thereof, there is shown an apparatus for preparing bast fibrous plants in accordance with the invention having means, indicated generally by the reference numeral 20, for cutting ramie stalks, including stems and leaves, into desired lengths, means, indicated generally by the reference numeral 21, for separating stalk lengths from leaves and stems, stalk flattening means, indicated generally at 22, and decorticating means, indicated generally at 23. For convenience of presentation, these several means will be described hereinafter under separate titles, but it will be understood that they cooperate to produce a unitary result. Moreover, under some circumstances, the several means may be subcombined for the attainment of advantageous results.

Cutting means

Figures 3, 4, 5, 6:
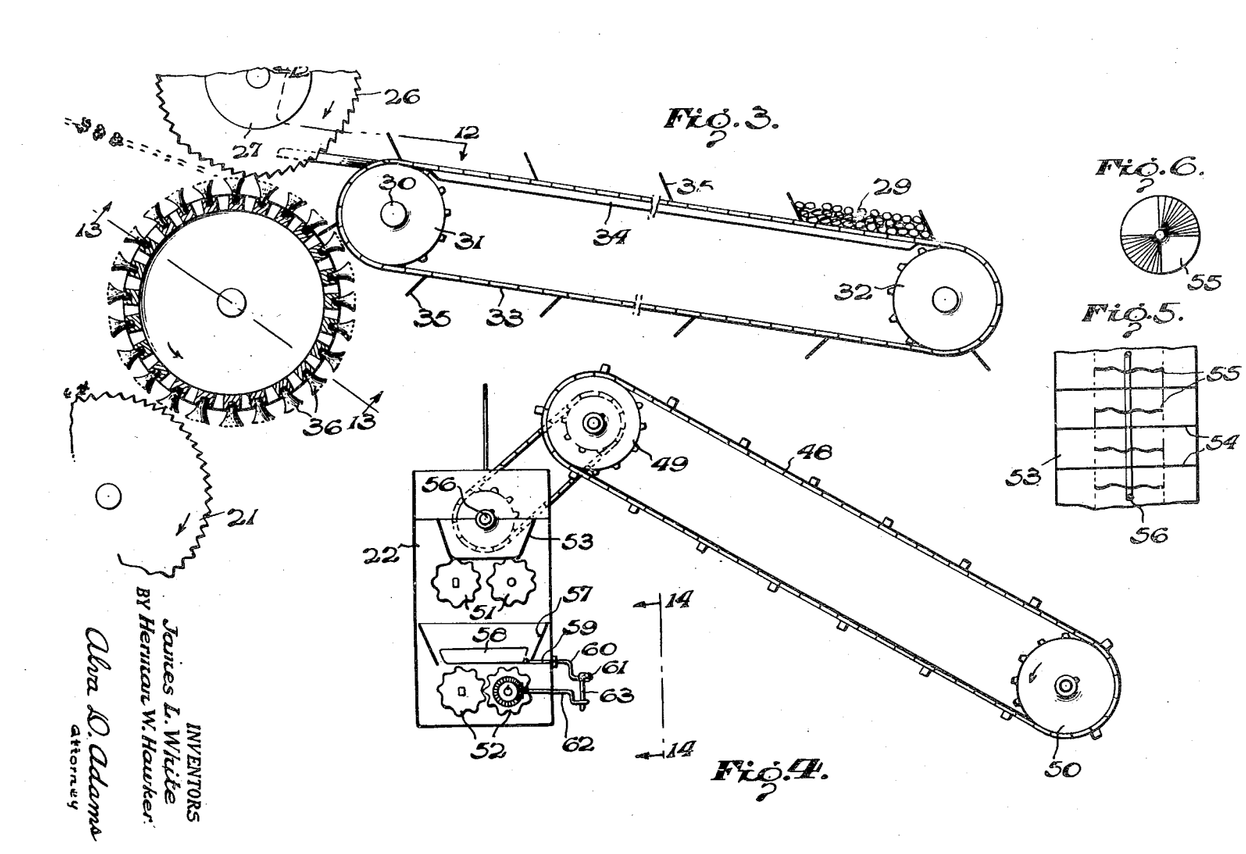
Fig. 3 is an enlarged detail sectional view of the initial feeder, cutting saws and a portion of the de-leafing apparatus.
Fig. 4 is an enlarged detail view, partially in elevation, of the stalk flattener and stalk flattener feeder.
Fig. 5 is a fragmentary plan view of the stalk flattener housing showing the feed hopper and aligning discs.
Fig. 6 is a detail elevational view of one of the aligning discs shown in Fig. 5.
Figure 7:
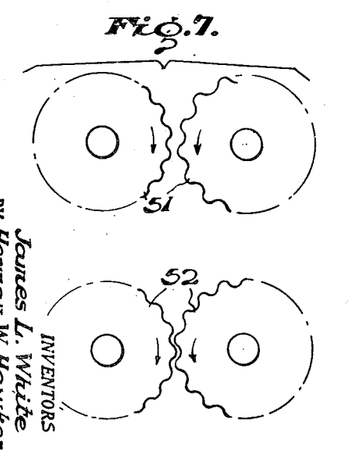
Fig. 7 is an end view of the flattening rolls.
Figure 12:
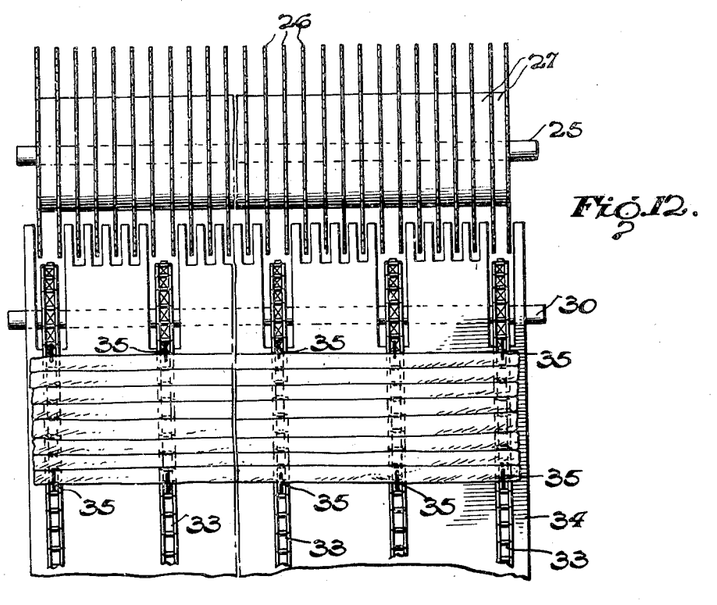
Fig. 12 is a view of the saws and initial feeder taken along the line 12—12 of Fig. 3.

Means for dividing the undeleaved plants, seen at 20 in Fig. 2, is shown in enlarged detail in Fig. 3 and in partial plan view in Fig. 12. A detail plan view of the cutting saw assembly is shown in Fig. 8.

Figure 8:
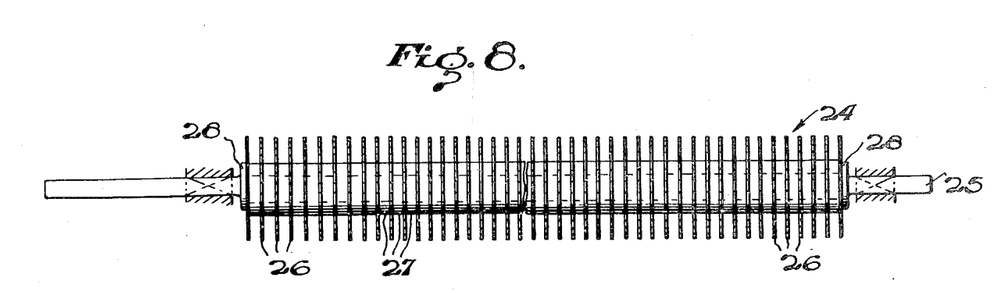
Fig. 8 is a detail plan view of the cutting saw assembly.

Referring to Figs. 3, 12 and 8, the dividing means may take the form of a saw assembly 24 including a shaft 25, a plurality of saw discs 26 mounted on the shaft for rotation therewith, and a plurality of spacers 27 for maintaining the saw discs in spaced relation. The assembly may be held together by suitable means such as nuts 28 threaded on the shaft. The spacing of the saw discs is selected to provide cut lengths of stalk equivalent to the length desired in the finished staple; for this purpose, spacers of various widths may be provided.

Stalks of ramie 29, as harvested, are fed to the saws by a chain conveyor having a drive shaft 30 and sprockets 31 mounted thereon, an idler sprocket assembly 32 and spaced chains 33, the upper runs of which ride on a table 34. Upstanding, forwardly inclined fingers 35 provide flights for carrying the stalks to the saws.

For the purpose of keeping the teeth of the saw blades clean and free from adhering plant particles and for the purpose of directing the cut stalks to the deleafing device feeder, there is provided a rotary brush 36, which rotates in light contact with the saw blades and throws the cut stalks and leaves away from the saws and into the compartment 37 as indicated in Fig. 2. Directions of movement of the saws, brushes and other elements of the apparatus are shown by arrows in Fig. 2. The material from the saws slides down the inclined bottom 38 of the compartment 37 to the deleafing device.

Figure 13:
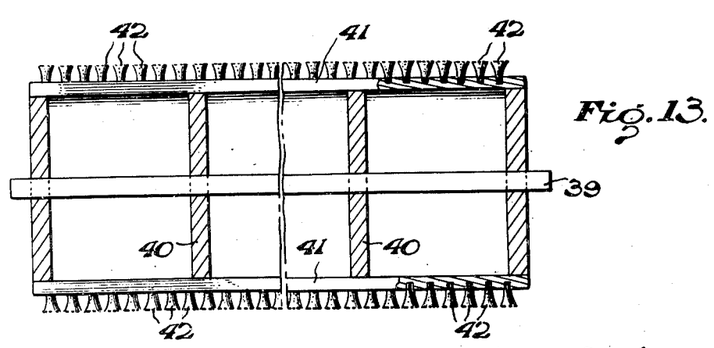
Fig. 13 is a sectional view on the line 13—13 of Fig. 3.

The brush 36, shown in section in Fig. 13, is carried by a shaft 39. On the shaft are a number of spaced wooden discs 40 which support upon their peripheries a plurality of wooden slats 41 disposed parallel to the shaft. Tufts of bristles 42 are appropriately affixed to the slats, as by insertion in holes bored radially in the slats.

Deleafing means

The deleafing means, seen at 21 in Fig. 2, comprises an assembly of discoid pickers 43 mounted for rotation with the shaft 44. The picker assembly is in all respects but one similar to the assembly of cutting saws shown in Fig. 8. It differs only in that the peripheral teeth of the discs are not set for cutting, but simply provide inclined points which catch or snare the leaves and stems on cut stalk lengths sliding down the slope 38, pick them up and carry them clockwise, as seen in Fig. 2, to the brush 36 where they are swept off the picker discs and out of the apparatus through a port 45. It will be observed that the brush 36 performs the dual service of cleaning both the saws 26 and the pickers 43.

The cut lengths of stalk, due to their character, including size, shape and weight, are not caught on the teeth of the picker discs; they fall through the transverse opening 46 to be carried to the stalk flattener. The opening 46 preferably is adjustable in size, being controlled by a plate member 47 slidably mounted on the lower edge of the compartment bottom 38, the opening being adjusted in operation to permit passage of the short stalk lengths while preventing the leaves from falling through. The cut stalk lengths drop through the adjustable opening at the base of the hopper by gravity, but the leaves, because of their bulk and light weight, do not drop through the opening. They are pressed against the discs so that they are engaged by the teeth on the discs and removed from the mass of leaves and cut stalks in the hopper.

Stalk flattener means

Details of the flattener, indicated generally at 22 in Fig. 2, are shown in Figs. 4, 5, 6, 7, and 14.

Deleafed, cut lengths of stalk, falling from the deleafing device, are caught upon a belt conveyor 48, which has a driving roll 49 and an idler roll 50, and are fed by the conveyor to the flattener 22.

The flattener comprises vertically spaced pairs of fluted rolls, the upper pair 51 of which are spaced to provide a nip about twice as wide as the nip of the lower pair of rolls 52. They are shown in Fig. 2 as being driven by gears 51a and 52a. For crushing ramie, the nip of the upper rolls may be about ¼ inch and the nip of the lower rolls may be about ⅛ inch. Preferably, the crusher rolls are made of brass, and as much as possible of the metal exposed to the juice of the ramie is made of brass, aluminum or other metal that is resistant to the corrosive action of the juice. The same materials of construction may be used to advantage in the following parts of the machine for the same purpose. The crusher serves to break up the woody material of the plant stalks passing between the rolls without breaking or damaging the fibers.

It is desirable that the cut stalk lengths pass between the rolls at right angles to the roll axes. To insure this action, there have been provided means for aligning the stalk lengths being fed to the upper and to the lower rolls.

The stalk aligning means for the upper rolls is best seen in Figs. 5 and 6. It comprises a hopper trough 53 having an open bottom and fixed transverse vertical baffles 54 that are spaced apart a convenient distance depending upon the length of the pieces of stalk to be crushed—about 2½ inches spacing has been found desirable for stalk lengths of an inch or a few inches. Between the stationary baffles 54, revolving guides 55 are mounted upon a shaft 56. The revolving guides are disc-like but are not flat; they have an undulating surface which increases their frictional engagement with the pieces of stalk and tends to align the pieces of stalk radially of the revolving guides. Thus, the pieces of stalk which are dropped from the bottom of the trough 53 are vertically disposed and pass between the upper rolls at right angles to the roll axes.

Figure 14:
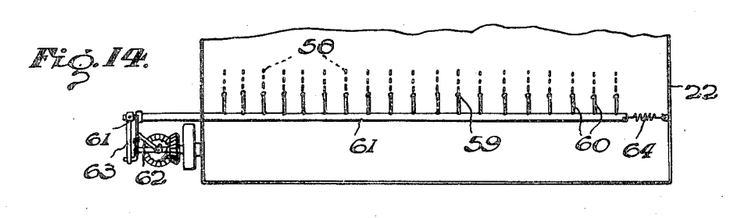
Fig. 14 is a fragmentary right-hand view of the stalk flattener taken along the line 14—14 of Fig. 4.

The aligning means for the lower set of rolls 52 includes a hopper trough 57, having an open bottom disposed over the nip of the rolls, and a number of transverse baffles 58 mounted on shafts 59. The ends of the shafts extend from the flattener housing and take the form of cranks 60, the handles of which are movable in unison by a bar 61 to which they are attached. It will be seen that the baffles 58 may be rocked in unison by oscillating the bar 61. Such oscillatory movement is imparted to the bar by means of a rotating crank 62, driven through bevel gearing from one of the lower rolls 52, which engages a finger 63 depending from the bar 61 to urge the bar to the left as seen in Fig. 14. The bar is urged to the right by a tension spring 64, one end of which is attached to the bar and the other end of which is attached to the flattener housing. The rocking motion of the baffles 58 causes partially flattened lengths of stalk to be fed therethrough to the lower rolls in the desired upright or vertical direction.

Flattened stalk lengths from the lower flattened rolls fall upon the slide 65 (see Fig. 2) and are conveyed by gravity down the slide to the decorticating means.

Decorticator

The decorticating means of the invention will be described with particular reference to Figs. 9, 10, 11 and 15, which show in detail that part of the apparatus generally designated 23 in Fig. 2. It includes principally a rotary member 66, herein called the Chinamen roll, a decorticating disc assembly 67, a rotary brush 68 and a plurality of stationary teeth 69, herein called Chinamen's wives. Its purpose, as its name implies, is to separate the woody and pithy material of the flattened stalk lengths from the fibrous component.

Figure 15:
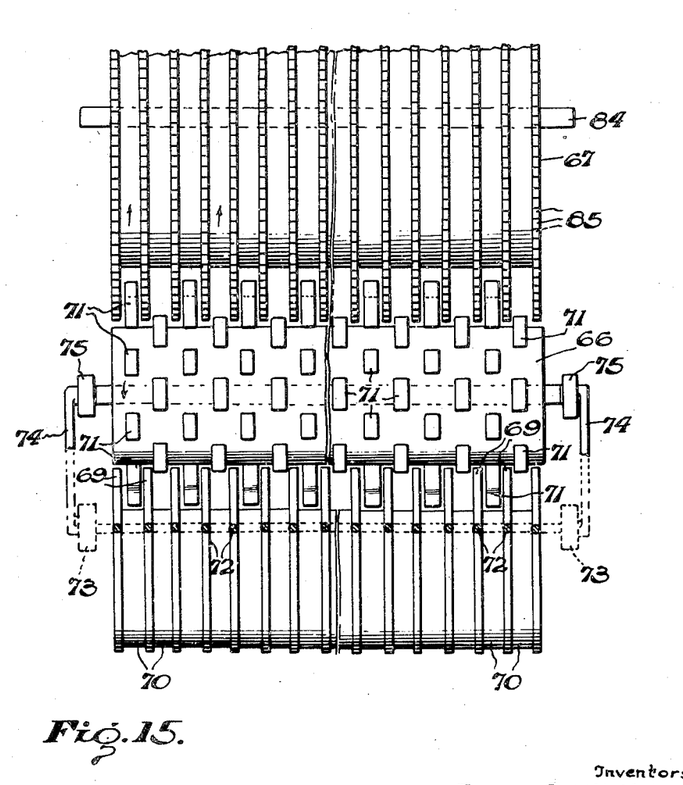
Fig. 15 is a view taken along the line 15—15 of Fig. 9.

The Chinamen's wives 69 are separated by spacers 70, the wives and spacers being assembled, as shown in Fig. 15, to provide a comb of which the teeth consist of the Chinamen's wives. The Chinamen roll 66 has a number of fingers 71, called Chinamen, which are axially spaced in parallel planes and so dimensioned that they pass between the Chinamen's wives as the roll is rotated. The rows of Chinamen are staggered on the roll 66, as best seen in Fig. 15, so that they pass alternately between the wives 69.

Figure 9:
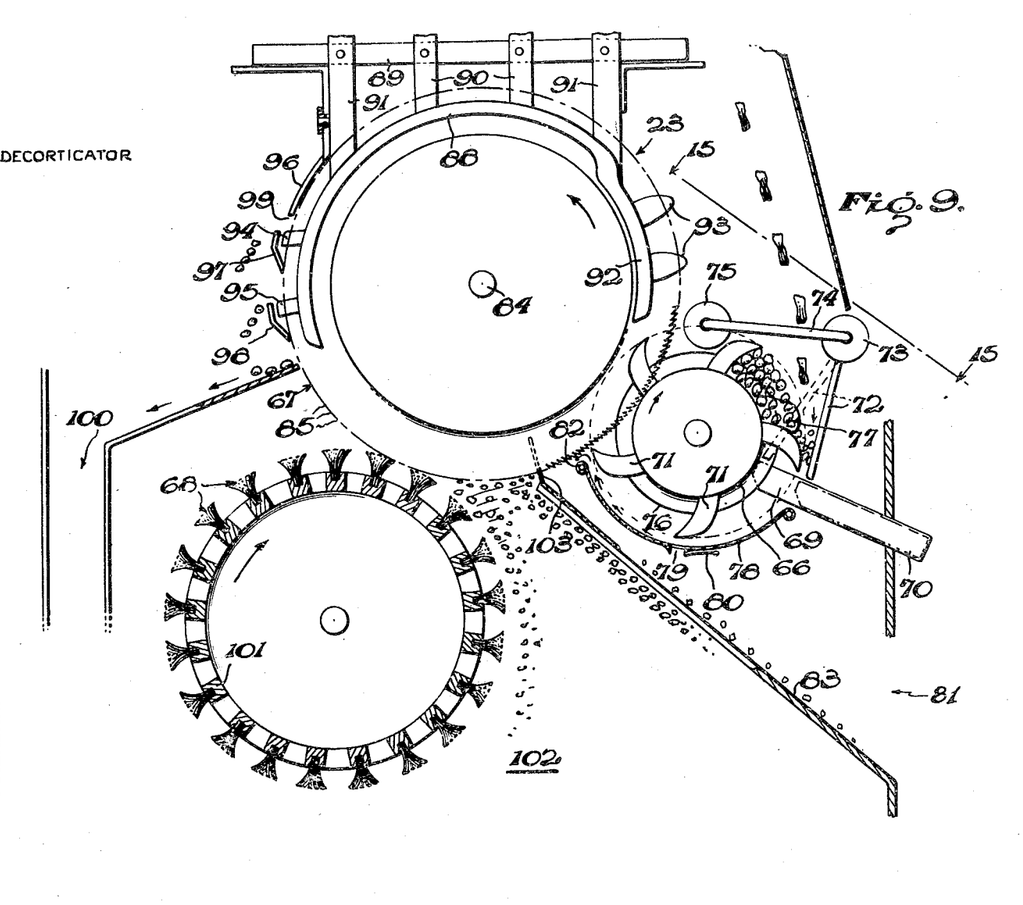
Fig. 9 is an enlarged sectional view of the decorticator and associated elements.

Over each Chinaman's wife is a wiper rod 72 shown in Fig. 9 which depends from a common shaft 73. The shaft has an arm 74 at the end of which is a roller 75 which follows a cam 76 that is mounted coaxially on the Chinamen roll and rotates therewith. The cam has a raised portion 77 which elevates the roller once in each revolution of the Chinamen roll, causing the wiper rods 72 to move in unison inwardly of the Chinamen roll over the upper surfaces of the Chinamen's wives for a purpose which will become evident as the description proceeds. The inner position of the wiper rods 72 is shown in dotted lines in Fig. 9.

An arcuate metal pan 78 is mounted under the Chinamen roll. It extends the full width of the roll and, in the direction of rotation of the roll, extends from immediately beneath the Chinamen's wives to the decorticating discs. The bottom of the pan has a number of holes 79, the openings of which may be adjusted by means of a slide 80. Such holes permit egress of small particles of woody matter from the pan.

The flattened stalks from the flattener 22 flow down the slide 65 and are introduced to the decorticator between the Chinamen roll 66 and the row of wiper rods 72, as indicated in Fig. 9. The flattened stalk lengths accumulate against the wiper rods between the teeth on the Chinamen roll but cannot escape through the spaces between the wiper rods. They have a tendency to cling together due to the gum in them. Initial and partial decortication takes place as the crushed stalk lengths are forced between the Chinamen's wives by the action of the rotating fingers 71. Clearance between the Chinamen and the Chinamen's wives may be, for example, about $\frac{1}{16}$ of an inch. The larger wood chips and particles are scraped from the stalks by the Chinamen's wives and pass downwardly and to the left, as seen in Fig. 9, onto the pan 78 and, then follow through the openings 79 and out of the apparatus through a port 81, as shown in Fig. 2. The wiper rods prevent whole, crushed stalk lengths from escaping between them above the Chinamen's wives.

The staple lengths of partially decorticated fiber are carried by the Chinamen through the pan 78 to the decorticating disc assembly 67. As hereinbefore explained, some woody particles or chips leave the pan through the holes 79 and some are carried over the lip 82 of the pan, from which they fall upon the inclined partition 83 and pass out of the apparatus through the port 81. However, the fiber bearing pieces are snared by the Chinamen and are conveyed beyond the lip to be decorticated.

Figure 11:
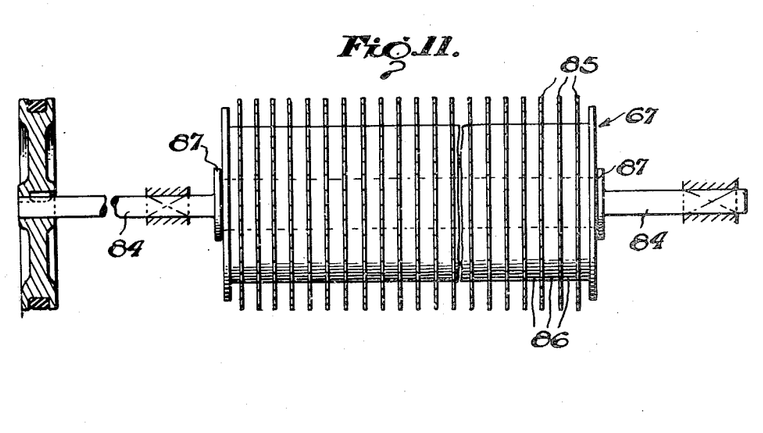
Fig. 11 is an end view of the decorticating disc-and-shaft assembly.

The decorticating disc assembly shown in Fig. 11 has a shaft 84 upon which are mounted a plurality of discs 85 the peripheries of which are provided with serrations or pointed teeth similar to those of the de-leafing pickers 43. These serrations are not cutting-teeth, although they resemble saw teeth; instead, they are preferably machined straight across the disc and have leading and following faces disposed at right angles to the plane of the disc. The discs are keyed to the shaft and are separated by spacers 86, the assembly of discs and spacers being retained on the shaft by nuts 87. In one embodiment of the machine, spacers having an axial dimension of $\frac{1}{4}''$ have been found satisfactory.

Figure 10:
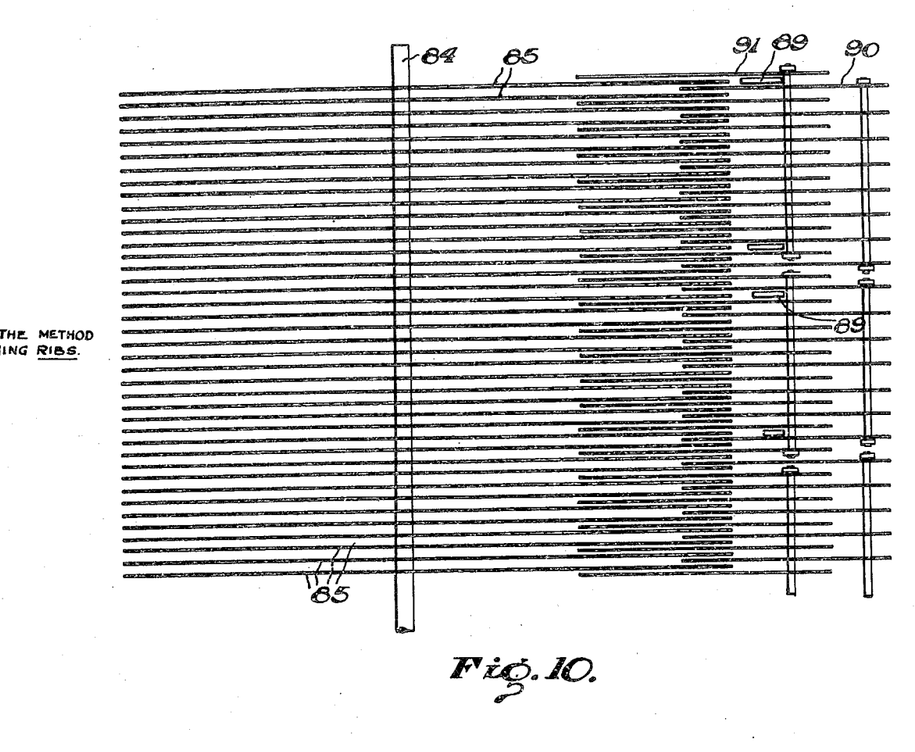
Fig. 10 is a further enlarged end view of the decorticating disc and cooperating rib assembly.

Between adjacent decorticating discs there are disposed stationary ribs 88. These ribs, in the illustrative embodiment, are $13/64$ of an inch in thickness, thereby providing a clearance of $3/128$ of an inch between a rib and an adjacent disc. The ribs are suspended from cross members 89 by hangers 90 and 91, as shown in Figs. 9 and 10, hangers 90 and 91 supporting alternate ribs so that material being carried by the teeth of the decorticating discs will not be brushed off by the hangers, or caught behind them.

The ribs 88 are generally arcuate but they have a radially inward portion 92 located near the Chinamen roll. This radially inward portion has two outwardly projecting rounded dogs 93 which extend beyond the periphery of the decorticating discs. Approximately diametrically opposite the dogs 93, another pair of angular dogs 94 and 95 project outwardly from the ribs. The purpose of these dogs will be explained hereinafter.

A metal strip 96, having approximately the same curvature as the decorticating discs, is mounted slightly above the dogs 94. It is radially adjustable and preferably is spaced about $\frac{1}{16}$ of an inch from the periphery of the discs. It extends the full width of the decorticator disc assembly. Strips 97 and 98 are mounted adjacent to the dogs 94 and 95, respectively, and also extend the full width of the disc assembly. The upper edges of strips 97 and 98 are spaced from the dogs about $\frac{1}{4}$ of an inch, and the lower edges are spaced from the discs approximating $\frac{1}{16}$ of an inch.

The action of the decorticating discs and associated parts will now be described with particular reference to Fig. 9.

Partially decorticated material is delivered to the decorticating discs by the Chinamen. The peripheral speed of the decorticating discs is somewhat greater than the peripheral speed of the Chinamen; hence the teeth of the discs pick up the strands or ribbons of fiber from which part of the wood has been removed and carry them counterclockwise, as seen in Fig. 9, to the dogs 93. As the strands are moved past the dogs, more of the wood is stripped from the fiber by the dogs. The wood which is here removed falls back to the Chinamen roll and is, in large part, eliminated by being delivered through the openings in the pan 79, and, also, over the lip 82.

The fiber strands are carried by the decorticating discs from the dogs 93 to the region of the strip 96. Passage under the strip 96 serves to compact the fiber against the discs and to remove still more of the adherent wood which passes through the opening 99 by centrifugal force and into the compartment 100 from which it may be periodically removed and discarded. The fiber next encounters the dogs 94 which strip off additional wood and discharge the latter to the waste compartment. Strip 97 and dogs 95 function similarly to strip 96 and dogs 94 to remove further increments of wood from the fiber. The lower edge of strip 98 causes the finally decorticated fiber to adhere to the discs 85 for transportation to the decorticator brush 101.

The decorticator brush 101 is substantially identical with the brush 36 previously described in connection with the sawing and de-leafing devices. It revolves at relatively high speed in light engagement with the teeth of the decorticating discs and removes decorticated fiber therefrom, throwing the fiber into the bin 102 from which it may be removed as desired. In order to prevent fiber from escaping past the partition 83, the top of the partition is provided with a comb 103 having teeth extending between the decorticating discs, which forms an effective barrier against carry-over.

The finished fiber may be degummed and/or otherwise processed in any desired manner.

Figure 1:
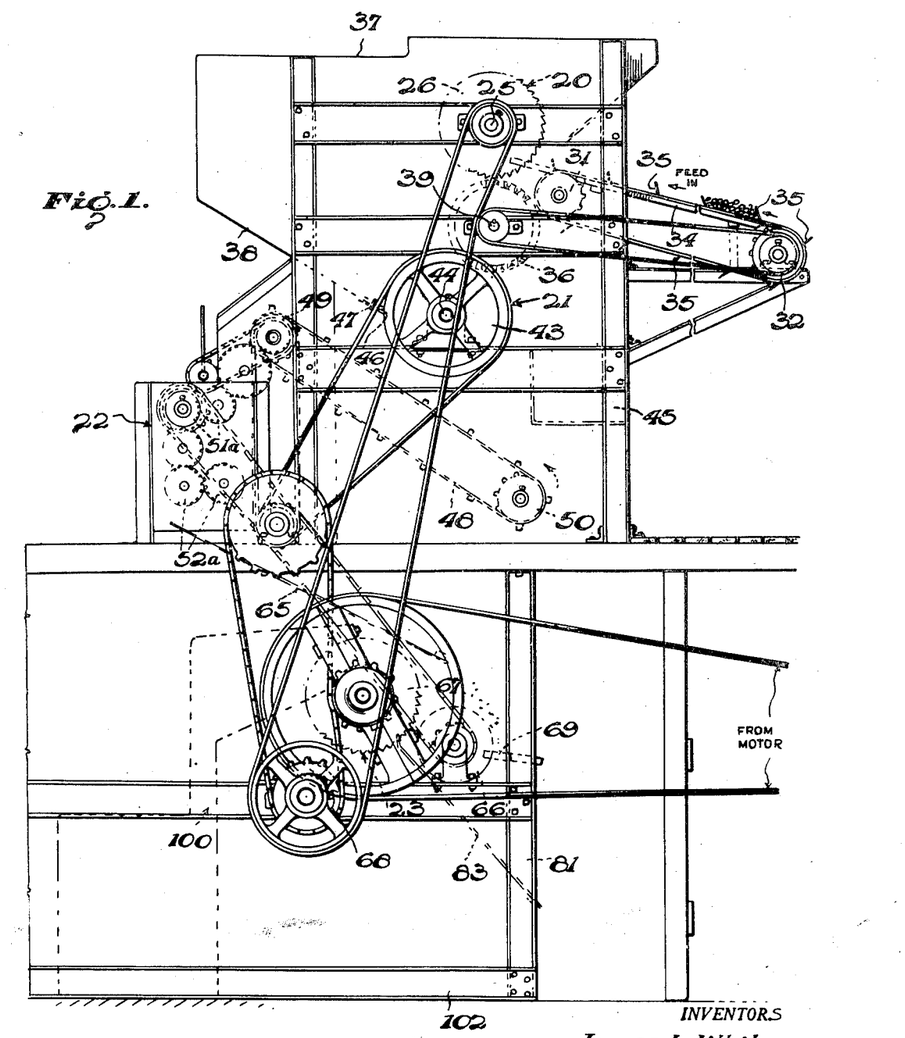
Fig. 1 is a side elevational view of one embodiment of the invention showing the driving arrangement for the several machine elements.

Referring to Fig. 1, there is shown an exemplary driving arrangement for the several elements of the machine. The driving arrangement is considered to be largely a matter of design forming no essential part of the present invention. Figure 1 is believed to be self-explanatory, arrows indicating directions of movement of the parts, and no detailed description thereof is thought to be necessary.

In one form of the apparatus of the invention, the rotary members have the following characteristics:

| Rotary Member | Reference Numeral | Diameter, Inches | Rotational Velocity, R. P. M. |
| --- | --- | --- | --- |
| Saws | 26 | 12 | 800 |
| Brush | 36 | 14¾ | 1,000 |
| Deleafer | 43 | 12 | From 15 to 50 |
| Flattening | 51 and 52 | 3¼ | 100 |
| Chinamen Roll | 66 | 6¼ | 200 |
| Decorticator Disc | 67 | 12 | 200 |
| Brush | 68 | 14¾ | 800 |

In operation, green ramie stalks, as harvested, are placed upon the flight conveyor, as shown at 29 in Fig. 3, and are carried to the saws 26 where the ramie stalks are cut into the desired length. The cut stalk lengths, including leaves and stems, are brushed from the saws and fed down the slide 38, as seen in Fig. 2, to the deleafing device 21, where leaves and stems are separated from the cut stalk lengths. The leaves and stems are brushed from the picker discs 43 and pass out of the apparatus through the port 45, while the deleaved cut lengths of stalk fall through a port 46, the width of which is controlled by an adjustable slide 47, to the conveyor 48 and are thence fed to the flattener 22. In the flattener, the short lengths of stalk are worked between the corrugated rolls to break up the woody matter without damaging the fibers. From the flattener, the flattened stalk lengths slide down the surface 65 to the decorticator, in which the woody and pithy matter is separated from the fibers, as described hereinbefore in detail.

From the foregoing description, it will be seen that there has been provided an efficient apparatus and process for preparing ramie and similar bast fibrous plants for degumming and/or subsequent treatment. It will be evident that the invention is not limited to the specific embodiment thereof herein shown and described. Modifications will occur to those skilled in the art without departing from the spirit and scope of the invention as defined in the claims.

We claim:

1. Apparatus for preparing ramie and similar bast fibrous materials for further processing which comprises a series of spaced rotary cutters for cutting the green stalks, as harvested, into short lengths which will yield the desired final staple length; a conveyor for feeding the stalks transversely in succession to the cutters; rotary snaring means for separating the leaves and stems from the stalk lengths; means for removing the separated leaves and stems from said snaring means; means for guiding the stripped stalk lengths endwise; crushing means for flattening the guided stalk lengths to break up the woody and pithy material without damaging the fiber.

2. Apparatus for decorticating ramie stalks and the like which comprises a comb-like structure; a rotary member having fingers passing between the teeth of said comb-like structure as the member rotates; a plurality of coaxial discs having peripheral teeth mounted for rotation between the arcs of rotation of the fingers of said rotary member; and scraper elements constructed and arranged to operate between adjacent coaxial discs.

3. Apparatus as defined in claim 2 wherein means is provided for confining partially decorticated ramie and the like to the arc of rotation of the fingers of the rotary member extending between said comb-like structure and said discs.

4. Apparatus as defined in claim 2 wherein said scraper elements are peripherally disposed about said discs, and means is mounted between scraper elements for compacting, against the peripheries of said discs, fiber and other matter adhering to the discs.

5. Apparatus for preparing ramie and similar bast fibrous materials for further processing which comprises means for cutting the green stalks, as harvested, into short lengths which will yield the desired final staple length; means for separating the leaves and stems from short lengths of stalk; flattener means for breaking up the woody and pithy material of the stalk lengths whilst leaving the fibers undamaged; and means for decorticating the crushed stalk lengths including, a comb-like structure, a rotary member having fingers passing between the teeth of said comb-like structure as said rotary member rotates, a second rotary member including a plurality of coaxial discs having peripheral teeth mounted for rotation between the arcs of rotation of the fingers of said first named rotary member, and scraper elements constructed and arranged to operate between adjacent coaxial discs of said second rotary member.

6. Apparatus as defined in claim 5 wherein means is provided for confining partially decorticated bast fibrous material to the arc of rotation of the fingers of said first named rotary member, said means extending between said comb-like structure and the disc of said second rotary member.

7. That method of preparing ramie and similar bast fiber stalks for further processing which is characterized by feeding green, leafy stalks transversely and in succession to a cutting zone; cutting the green stalks with the leaves still attached into short pieces to yield the desired staple lengths; guiding the cut pieces to a separating zone; snaring and separating the leaves and stems from the stalk lengths; disposing of the separated leaves and stems; guiding the stalk lengths endwise and flattening them to break up the wood and pithy material without damaging the fibers; and separating the fibers from the woody and pithy components of the crushed stalk lengths.

JAMES L. WHITE.
HERMAN W. HAWKER.

REFERENCES CITED

The following references are of record in the file of this patent:

UNITED STATES PATENTS

| Number | Name | Date |
|---|---|---|
| 428,257 | Stewart | May 20, 1890 |
| 995,561 | Picard | June 20, 1911 |
| 1,715,911 | Gminder | June 4, 1929 |
| 1,846,859 | Gminder | Feb. 25, 1932 |
| 1,945,783 | Mitchell | Feb. 6, 1934 |